F. E. COOK.
SELF LOCKING GREASE PLUG.
APPLICATION FILED MAR. 23, 1921.
1,395,259.
Patented Nov. 1, 1921.
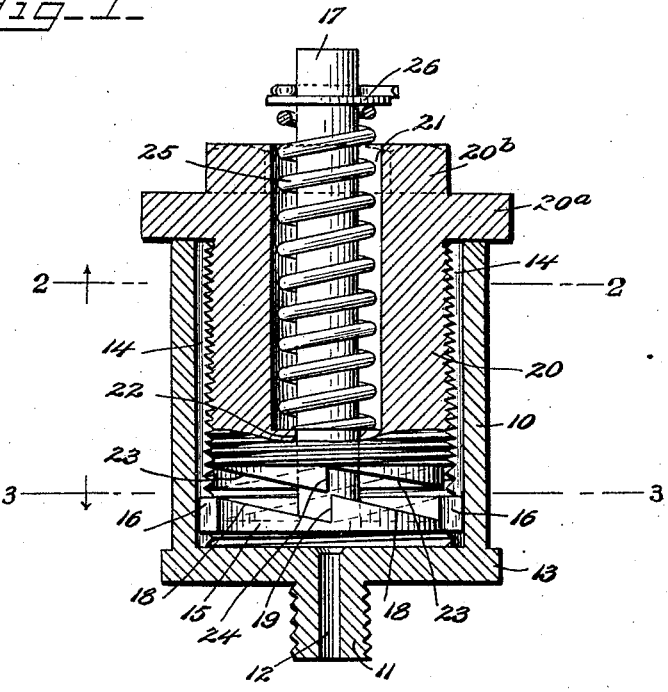
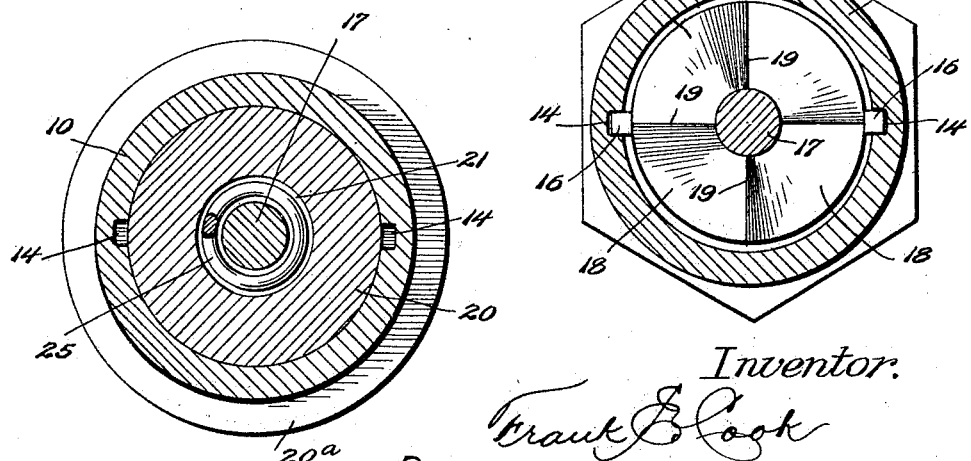
Inventor:
Frank E. Cook
By Watson, Coit, Morse and Grindle
Attorneys.

UNITED STATES PATENT OFFICE.

FRANK E. COOK, OF AMARILLO, TEXAS.

SELF-LOCKING GREASE-PLUG.

1,395,259.   Specification of Letters Patent.   Patented Nov. 1, 1921.

Application filed March 23, 1921. Serial No. 454,935.

*To all whom it may concern:*

Be it known that I, FRANK E. COOK, a citizen of the United States, residing at Amarillo, in the county of Potter and State of Texas, have invented certain new and useful Improvements in Self - Locking Grease-Plugs, of which the following is a specification.

This invention relates to improvements in grease cups and particularly to a self-locking device for use in forcing the grease from the cup.

The ordinary grease cup is provided with a plug or plunger which is threaded into the cup and which is held in position by means of a jam nut. This construction possesses certain defects and disadvantages, since it frequently happens that the jam nut is not tightened sufficiently to securely retain the plug in the cup with the result that the plug and nut become detached and lost and it also frequently occurs that the jam nut is tightened so forcibly as to strip the threads on both the cup and plug thereby necessitating new threads on the cup or an entirely new cup and plug. Such prior constructions are particularly defective and unsatisfactory when employed on locomotives since the working of the engine and the constant jar and vibration to which locomotives are subjected loosen both the plug and the jam nut with the result that both are lost and consequently the parts receive no lubrication until a new plug can be applied. The result is considerable expense in providing new plugs and considerable difficulty due to the lack of lubrication when a plug becomes detached and lost.

The present invention aims to provide a grease cup in which the plug is automatically locked when forced into the cup and which is held from accidental removal therefrom, the parts being so arranged that the plug may be withdrawn from the cup when desired for purpose of refilling the same. My improvement possesses particular utility on locomotives since it obviates the difficulties heretofore mentioned but it is of course useful on machinery of any kind where grease cups are employed. Other advantages of the invention will be hereinafter pointed out.

In the drawing accompanying this specification and forming a part thereof one embodiment of my invention is illustrated. In these drawings:

Figure 1 is a longitudinal section partly in elevation showing the construction of a grease cup with my invention applied thereto;

Fig. 2 is a transverse sectional view on the line 2—2 of Fig. 1;

Fig. 3 is a transverse sectional view on the line 3—3 of Fig. 1.

Referring to the drawings in detail, 10 represents the body of the cup which is adapted to receive the grease and which is provided with a threaded projection 11 for securing the cup in the desired position, such projection having a passage 12 through which the grease is forced to the part to be lubricated. The lower end of the cup 10 is also provided with a flange 13 to which a wrench or other suitable tool may be applied in attaching the cup to the part to be lubricated.

The cup 10 is internally threaded and is provided with longitudinal grooves 14 preferably two in number which extend from the top to the bottom thereof. A plug 15 is mounted in the cup and is shaped to fit the same, this plug being provided with lugs 16 which engage and fit the grooves 14 formed in the inner wall of the cup. The plunger 15 is thus prevented from rotation relative to the cup 10. A stem 17 is suitably secured to the plug 15 preferably by being cast integral therewith and this stem is preferably of a length sufficient to extend some distance above the top of the cup. The upper surface of the plug 15 is provided with a series of inclined surfaces 18 and at the end of each of these surfaces there is formed an abrupt shoulder 19, which shoulders accomplish a function to be later described.

A plunger 20 is mounted in the cup 10 this plunger being provided on its exterior surface with threads adapted to coöperate with the threads heretofore mentioned on the inner wall of the cup. At its top or outer portion, the plunger 20 is formed with a flange 20$^a$ which is adapted to contact with the top of the cup 10 and limit the extent to which the plunger may enter the cup, this being necessary in order to provide clearance for the plug 15 beneath the lower end of the plunger 20 so that the plug may be disengaged from the plunger. The plunger also carries an angularly formed portion 20<sup>b</sup> which is adapted to receive a wrench or other suitable tool for rotating the plunger in the cup. The plunger 20 is provided with a bore 21 through which the stem 17 heretofore mentioned is adapted to project, this stem slidably extending through an opening 22 in the bottom of the plug 20. The bottom or inner surface of the plunger 20 is formed with a series of inclined surfaces 23 and with a plurality of abrupt shoulders 24 which surfaces and shoulders are similar to those formed on the upper surface of the plug 15.

The shoulders 24 of the plunger 20 and the shoulders 19 of the plug 15 face in opposite directions, that is, they are so arranged that when the plug and plunger are in contact with each other the plunger will be prevented from rotating in one direction by engagement of said shoulders 24 and 19 but will be free to rotate in the opposite direction.

The plug 15 is normally held in contact with the lower surface of the plunger 20 through the medium of a coiled spring 25 which surrounds the stem 17 of the plug 15 and which bears at one end against the bottom of the bore 21 in the plunger 20 and at the opposite end against a suitable washer 26 mounted on the stem 17.

In the operation of the device it will be understood that after the cup 10 is filled or partially filled with grease the plug 15 is placed in the cup with the lugs 16 thereof engaging the grooves 14 in the inner wall of the cup. The plunger 20 is now threaded into the cup which causes the plug 15 to move toward the bottom of the cup and force the grease therefrom through the passage 12. As the plunger 20 is screwed downwardly into the cup 10 the surfaces 23 thereof will slide over the surfaces 18 of the plug 15 and rotation of the plunger will not be interfered with. It is apparent, however, that the plunger 20 cannot be rotated in the opposite direction since such rotation will be prevented by contact of the shoulders 24 thereof with the shoulders 19 of the plug 15, it being understood that the spring 25 serves to normally hold the plug against the lower face of the plunger. The plunger is therefore locked against rotation in a direction to cause its removal from the cup. It may be rotated from time to time to supply grease to the part to be lubricated but it cannot be rotated in the opposite direction while the plug is in contact therewith.

When the plunger reaches the downward limit of its movement determined by the flange 20<sup>a</sup> or when for any reason it is desired to withdraw the plunger and plug from the cup this may be done by merely forcing and holding the plug 15 out of contact with the plunger through the medium of the stem 17 and by rotating the plunger 20 in a direction to cause the same to recede from the cup. The plug 15 will of course be withdrawn from the cup along with the plunger.

It will be apparent that the foregoing construction obviates the defects of the prior constructions heretofore mentioned. The plug or plunger cannot become accidentally detached from the cup so that loss of the same is prevented and the difficulties resulting from lack of lubrication is avoided. Furthermore, in operating this improved device it is only necessary to give the plunger 20 a turn or partial turn to supply grease to the part to be lubricated. The operation of loosening the jam nut before turning the plunger in the old type of device and afterward tightening the same are avoided and the use of wrenches of different sizes for operating the plunger and jam nut is also obviated. Another advantage of this improved device lies in the fact that when the plunger 20 is turned to force grease out of the cup a sharp sound or "click" will be heard at each quarter turn when the plug 15 is brought into contact with the lower face of the plunger 20 by the coil spring 25. This sound serves as an indication of the amount of grease forced from the cup.

It is apparent that various modications in the details of the foregoing construction may be made without departing from the spirit of the invention which is not limited to such specific details but contemplates various changes and modifications which fairly come within the scope of the appended claims.

Having thus described the invention what I claim as new and desire to secure by Letters Patent is:

1. In a device of the kind described a cup for holding grease, a plunger rotatably arranged in said cup, a plug slidably and non-rotatably mounted in said cup in front of the plunger and movable into and out of contact with the plunger, and means for preventing rotation of the plunger in one direction relative to the plug when said parts are in contact with each other.

2. In a device of the kind described, a cup for holding grease, a plunger threadedly mounted in said cup, a plug slidably and non-rotatably mounted in said cup in front of the plunger and movable toward and away from said plunger, and interengaging means on said plug and plunger for preventing rotation of the latter in one direction relative to the former when the same are in contact.

3. In a device of the kind described, a cup for holding grease, a plunger rotatably arranged in said cup, a plug slidably and non-rotatably mounted in said cup in front of said plunger and movable toward and from the plunger, means for yieldingly holding the plug against the plunger, and means for preventing rotation of the plunger in one direction relative to the plug when the parts are held together.

4. In a device of the kind described, a cup for holding grease, a plunger rotatably arranged in said cup, a plug slidably and non-rotatably mounted in said cup in front of said plunger and movable toward and away from the plunger, means for yieldingly holding the plug against the plunger, means for moving the plug away from the plunger, and means for preventing rotation of the plunger in one direction relative to the plug when the parts are in contact.

5. In a device of the kind described, a cup for holding grease, means for forcing the grease from the cup comprising a plug and plunger movable toward and from each other, one of said last named parts being slidably and non-rotatably mounted in said cup and the other being movable into and out of said cup by rotation relative to the cup, and coöperating locking means carried by said plug and plunger for preventing rotation of said last named part relative to the cup.

6. In a device of the kind described, a cup for holding grease, a plunger arranged in said cup and movable into and out of the cup by rotation relative to the cup, a plug slidably arranged in said cup in front of said plunger, coöperating means carried by said plug and plunger for locking said plunger against rotation in a direction to cause removal of the same from the cup, means for yieldingly holding said coöperating means in contact, and means for moving the plug away from the plunger to disengage said locking means.

7. In a device of the kind described, a cup for holding grease, a plunger threadedly arranged in said cup, a plug slidably arranged in said cup and in front of said plunger, means for yieldingly urging said plug toward said plunger whereby said parts are locked against removal from said cup, and means for forcing said plug away from said plunger to permit removal of the parts from the cup.

8. In a device of the kind described, a cup for holding grease, a plunger mounted in said said cup and movable into and out of said cup by rotation relative to the cup, a plug arranged in said cup in front of said plunger and movable toward and from the latter, means for preventing rotation of said plug in the cup, means for yieldingly urging said plug toward said plunger and coöperating means carried by said plug and plunger for preventing rotation of the plunger in a direction to cause its withdrawal from the cup.

9. In a device of the kind described, a cup, a plunger having a part adapted to enter the cup, coöperating means on said cup and plunger for causing the latter to move into or out of the cup as the same is rotated relative to the cup, a plug non-rotatably mounted in the cup in front of the plunger and movable toward and away from the plunger, coöperating means on said plug and plunger for locking the latter against rotation in a direction to withdraw the same from the cup, and means for yieldingly holding said locking means in engagement.

10. In a device of the kind described, a cup for holding grease, said cup having a threaded surface, a plunger arranged in said cup and provided with threads engaging the threads of said cup, whereby rotation of said plunger will cause the same to move into or out of said cup, a plug non-rotatably mounted in said cup in front of said plunger, coöperating means carried by said plug and plunger for locking the latter against rotation in a direction to withdraw the same from the cup, means for yieldingly urging the plug toward the plunger whereby said plunger is normally locked against rotation in the aforementioned direction, and means for forcing said plug away from said plunger to permit removal of said parts from the cup.

11. In a device of the kind described, a cup for holding grease, said cup having a threaded surface, a plunger arranged in said cup and provided with threads engaging the threads of said cup, whereby rotation of said plunger will cause the same to move into or out of said cup, a plug non-rotatably mounted in said cup in front of said plunger, locking means carried by said plug and plunger for normally locking the latter against rotation in a direction to withdraw the same from the cup, and means for rendering said locking means inoperative to permit removal of said plunger and plug from the cup.

12. In a device of the kind described, a cup, a plunger arranged in the cup and movable into and out of the cup by rotation relative to the cup, said plunger having a bore, a plug arranged in the cup in front of the plunger and having a stem extending into the bore of the plunger, a spring engaging said stem for holding said plug in engagement with said plunger, means for preventing rotation of said plug relative to said cup, means operative when said plug and plunger are engaged for preventing rotation of said plunger in a direction to cause withdrawal of the same from the cup, said stem constituting means by which said plug may be disengaged from said plunger to permit removal of the plunger and plug from the cup.

13. In a device of the kind described, a cup, a plug movable into and out of the cup, means for preventing rotation of the plug relative to the cup, a plunger for forcing the plug into the cup, coöperating locking means carried by the plug and plunger for preventing removal of said plunger and plug from the cup, and means for releasing said locking means when desired to permit removal of said plunger and plug from the cup.

14. In a device of the kind described, a cup, a plug slidably and non-rotatably mounted in the cup, said plug having a shoulder on its outer surface, a plunger threadedly mounted in said cup and having on its inner end a shoulder adapted to coöperate with said first named shoulder to prevent rotation of said plunger in one direction relative to said plug, means for yieldingly holding said plug against the plunger whereby said shoulders prevent rotation of said plunger in a direction to cause its withdrawal from the cup, said plug being movable away from said plunger to permit rotation of the plunger in the last mentioned direction.

15. In a device of the kind described, a cup, a plug slidably and non-rotatably mounted in the cup, said plug having a plurality of shoulders on its outer surface, a plunger threadedly mounted in said cup and having shoulders on its inner end to coöperate with the first named shoulders, said plunger having a bore, said plug having a stem extending into said bore, a spring arranged in said bore and bearing against said stem to hold said shouldered portion of the plug against the shouldered portion of the plunger, whereby rotation of the plunger in the cup is prevented, said stem constituting means by which said plug may be moved away from said plunger to permit rotation of the plunger in the cup and removal of the plunger and plug from the cup.

16. In a device of the kind described, a cup having grooves on its inner surface, a plug arranged in said cup and having lugs engaging said grooves, a plunger threadedly mounted in said cup, coöperating means on said plug and plunger for preventing rotation of the latter in a direction to cause its withdrawal from the cup, yielding means for normally holding said plug and plunger in contact, said plug being movable out of contact with the plunger to permit rotation of the latter in the aforementioned direction whereby it may be removed from the cup.

FRANK E. COOK.